United States Patent
Masloff et al.

(10) Patent No.: US 8,883,868 B2
(45) Date of Patent: Nov. 11, 2014

(54) ROCK DUSTING COMPOSITIONS AND METHODS OF USE THEREOF

(75) Inventors: Brian Peter Masloff, Westminster, CO (US); James Edward Pinkley, Aurora, CO (US); Billy J. Brown, Shady Valley, TN (US); Steven J. Thorogood, Bristol, TN (US); John C. Fodor, Arvada, CO (US)

(73) Assignee: DSI Underground Systems, Inc., Martinsburg, WV (US)

( * ) Notice: Subject to any disclaimer, the term of this patent is extended or adjusted under 35 U.S.C. 154(b) by 164 days.

(21) Appl. No.: 13/207,884

(22) Filed: Aug. 11, 2011

(65) Prior Publication Data

US 2012/0181051 A1 Jul. 19, 2012

Related U.S. Application Data

(60) Provisional application No. 61/433,716, filed on Jan. 18, 2011, provisional application No. 61/469,267, filed on Mar. 30, 2011.

(51) Int. Cl.
| | |
|---|---|
| *C08J 9/16* | (2006.01) |
| *C08J 9/28* | (2006.01) |
| *C08J 9/30* | (2006.01) |
| *C08J 9/00* | (2006.01) |
| *A62C 99/00* | (2010.01) |
| *C08L 33/26* | (2006.01) |

(52) U.S. Cl.
CPC .............. *C08J 9/0066* (2013.01); *C08J 9/0023* (2013.01); *C08J 9/30* (2013.01); *A62C 99/0045* (2013.01); *C08J 2333/26* (2013.01); *C08L 33/26* (2013.01)
USPC ............... 521/61; 521/83; 521/91; 521/92; 521/142; 521/149; 524/425; 524/427; 507/102; 507/119; 507/120; 169/46

(58) Field of Classification Search
CPC ................................. C08J 9/0066; C08J 9/30
USPC .......... 521/61, 83, 142, 91, 92, 149; 524/425, 524/427; 507/102, 119, 120; 169/46
See application file for complete search history.

(56) References Cited

U.S. PATENT DOCUMENTS

| | | | | |
|---|---|---|---|---|
| 4,538,941 | A | | 9/1985 | Thorne ........................ 406/143 |
| 4,557,763 | A | * | 12/1985 | George et al. ................ 106/706 |
| 4,577,763 | A | | 3/1986 | Placke et al. |
| 4,805,702 | A | | 2/1989 | White ............................. 169/64 |
| 5,080,534 | A | | 1/1992 | Goodson et al. ............... 406/46 |
| 5,631,080 | A | | 5/1997 | Fugitt |
| 5,716,910 | A | * | 2/1998 | Totten et al. .................. 507/102 |
| 6,135,368 | A | | 10/2000 | Protan ........................... 239/654 |
| 6,166,119 | A | * | 12/2000 | Matsuo et al. ................ 524/376 |
| 6,224,250 | B1 | * | 5/2001 | Kreinheder et al. ............... 366/8 |
| 6,726,849 | B2 | | 4/2004 | Gay et al. ..................... 252/88.1 |
| 2003/0146410 | A1 | | 8/2003 | Gay et al. |
| 2005/0045853 | A1 | | 3/2005 | Colucci |
| 2009/0320720 | A1 | | 12/2009 | Roddy et al. |
| 2010/0288858 | A1 | | 11/2010 | Redman ........................ 239/654 |

FOREIGN PATENT DOCUMENTS

DE 3418000 * 11/1985

OTHER PUBLICATIONS

English machine translation of DE 34 18 000, Nov. 1985.*
International Search Report corresponding to PCT Application No. PCT/US2011/047397 dated Jan. 6, 2012.
International Preliminary Report on Patentability (IPRP) dated Apr. 5, 2013 from corresponding PCT/US2011/047397, pp. 47.

* cited by examiner

*Primary Examiner* — Irina S Zemel
(74) *Attorney, Agent, or Firm* — Ohlandt, Greeley, Ruggiero & Perle, L.L.P.

(57) ABSTRACT

A rock dusting composition composed of rock dust, e.g., limestone or other mineral dust, water, pumping aid, and polymer, e.g., acrylamide homopolymers, acrylamide copolymers, and combinations thereof, and a method for applying the composition to the surface of a mine. The composition has a water content and a polymer content sufficient to allow the polymer to (i) disperse water molecules within the composition and, upon drying of the composition, (ii) dissipate forming void spaces in the dried composition. The composition is useful for suppressing propagation of a flame and/or fire caused by ignition of coal dust and/or gas within a coal mine.

16 Claims, 3 Drawing Sheets

ROCK DUSTING COMPOSITIONS AND METHODS OF USE THEREOF

RELATED APPLICATIONS

This application claims the benefit of U.S. Provisional Application Ser. No. 61/433,716, filed on Jan. 18, 2011, and U.S. Provisional Application Ser. No. 61/469,267, filed on Mar. 30, 2011, both of which are incorporated herein by reference.

BACKGROUND

1. Field of the Disclosure

This disclosure relates to rock dusting compositions and methods of use thereof. The compositions are composed of rock dust, e.g., limestone or other mineral dust, water, pumping aid, and polymer, e.g., acrylamide homopolymers, acrylamide copolymers, and combinations thereof, and are applied to the surface of a mine. The compositions are useful for suppressing propagation of a flame and/or fire caused by ignition of coal dust and/or gas within a coal mine.

2. Discussion of the Background Art

It is well known that fires and explosions are a major hazard in the field of underground mining. The danger of fire and explosion is particularly acute in coal mining because of the existence of inherently explosive and flammable materials, such as methane gas and coal dust, in the underground coal mine.

The cause of such fires and explosions can be readily appreciated. Combustible materials are generally associated with the mining of materials, such as coal, which are based on organic chemicals. Not only is the coal itself combustible, but the mining operation produces small fragments of coal and coal dust which are introduced into the air. This material may well be combustible and even explosive under appropriate conditions.

Hydrocarbon gases are found in association with coal mine operations. The most commonly found gas is methane gas, the major component of natural gas. Other similar combustible hydrocarbon gases are also found in lesser quantities in association with coal mines. The gaseous materials which are released during coal mine operations are themselves extremely hazardous.

Coal mine operations can often result in sufficient sparks to ignite combustible and explosive materials. Coal mine operations require the use of many types of electrical apparatus as well as other types of machinery which can potentially produce sparks. The combination of spark-producing machinery and electrical equipment, and the extremely explosive and combustible coal dust and related gases, produces a hazardous situation.

The combination of potentially spark producing equipment and extremely combustible material found within underground mines has resulted in disaster on many occasions. In addition, underground explosions and fires are particularly difficult to survive. For example, the explosion may cause collapse of part of the mine tunnel. Fire and explosion underground produces large quantities of noxious gases which can easily produce personal injury or death to underground miners and others working underground. Thus, it can be seen that fires and explosions in underground mine operations are of particular concern to all involved.

Various solutions have been attempted in order to prevent fire and explosion in underground mine operations. A conventional method of minimizing the potential for fire and explosion has been to spread inert material within the interior of the mine. In some cases it is desirable to totally coat the interior walls, ceiling and floor of the mine tunnels. Adding inert material to the environment helps to maintain the ambient atmosphere within the mine at conditions which are not explosive or combustible. The inert materials spread onto the interior walls of the mine sufficiently dilute the mine dust and methane within the mine such that the atmosphere is not capable of propagating an explosion or fire. The coating also helps prevent further coal dust and the like from escaping into the air within the mine tunnel.

Dusting as a method of preventing explosions and fires within a mine has become accepted in the art. Under regulations promulgated pursuant to the Federal Coal Mine Health and Safety Act, dusting is now a requirement in many mines.

Regulations of the Mine Safety and Health Administration ("MSHA") provide that the interior of coal mines and the like should be coated with a coating of rock dust. MSHA sets forth regulations concerning the use and spreading of rock dust.

Extensive governmental regulations governing the use and administration of rock dust are now in place. The situations in which rock dust is required are also defined in detail by specific regulation. Thus, mine operators now find themselves in the position of being required to comply with extensive regulation regarding rock dusting. Rock dusting within coal mines, therefore, is often no longer just one alternative to dealing with potentially hazardous conditions, but rather, is absolutely required in many settings.

As indicated above, in underground coal mines, stone dusting of exposed rock surfaces is used to prevent and suppress fires caused by the ignition of coal dust and methane gas produced during the mining process. Stone dusting involves coating the surfaces of the mine with a fine-ground limestone dust. The dust adheres to the walls of the mine and prevents propagation of fires along exposed surfaces of unmined coal in the mine. In the event of the ignition of coal dust and gas within the mine, the concussion of an explosion and fire will cause the loosely adhering dust to fall from the surfaces of the mine to produce a limestone dust-air suspension that suppresses the propagation of flame and stops the fire.

Applying rock dust to mine walls is usually accomplished by dry spraying. This method has draw backs since to get the required quantity of dust to adhere to the mine walls, substantial amounts of dust can become air born. To reduce the air born concentration water is added to the dusting compound, however the water requirements to maintain a pumpable mixture results in a substantial proportion of the product sloughing to the mine floor. Adhesives can be added to the wet mixed material to increase viscosity, however as the product dries it will cake to the mine walls, preventing adequate dispersion in a methane explosion.

There is a need in the art for rock dust compositions that can be applied to mine surfaces, e.g., walls, ceilings and floors, in which air borne particles are minimized or eliminated during application. There is also a need in the art for rock dust compositions that, in blast/concussion situations, will disperse from the mine surfaces as a powdered material, not as lumps or chunks, thereby suppressing any explosion that may occur from methane ignition.

The present disclosure provides many advantages, which shall become apparent as described below.

SUMMARY

A composition composed of rock dust, e.g., limestone or other mineral dust, water, pumping aid, and polymer, e.g., acrylamide homopolymers, acrylamide copolymers, and combinations thereof, is applied to the surface of a mine.}

Rock dust is mixed with water to give a first mixture, a pumping aid is added to the first mixture to give a second mixture, and a polymer is blended with the second mixture to give a third mixture. The polymer and pumping aid can also be blended directly into the grout line. The third mixture is sprayed onto the surface of a mine, e.g., walls, ceilings and floors, and allowed to dry into a non-cohesive mass. The composition is applied with a spray device that allows it to adhere to the surfaces of the mine. The composition can be sprayed to a thickness suitable for the prevention and suppression of fires caused by the ignition of coal dust and methane gas. Once applied, the low water content of the composition permits evaporation of the water, resulting in a dry mass of fine, poorly-cohesive, material that dusts readily.

This disclosure relates in part to a composition comprising rock dust, water, a pumping aid, and a polymer.

This disclosure also relates in part to a foamed or aerated composition comprising rock dust, water, a pumping aid, and a polymer.

This disclosure further relates in part to a composition comprising rock dust and a polymer.

This disclosure yet further relates in part to a foamed or aerated composition comprising rock dust and a polymer.

This disclosure also relates in part to a composition applied on a coal mine surface. The composition comprises agglomerated particles. The agglomerated particles comprise polymer chains having rock dust particles attached thereto.

This disclosure further relates in part to a process for preparing a composition. The process comprises: a) providing a composition comprising rock dust, water, a pumping aid, and a polymer; and b) flocculating the composition under flocculation conditions sufficient to form agglomerated particles. The agglomerated particles comprise polymer chains having rock dust particles attached thereto.

This disclosure yet further relates in part to a process for preparing a composition. The process comprises: a) mixing rock dust and water to give a first mixture; b) adding a pumping aid to the first mixture to give a second mixture; and c) blending a polymer into the second mixture to give the composition.

This disclosure also relates in part to a process for preparing a composition. The process comprises: a) mixing rock dust and water to give a first mixture; b) mixing a pumping aid and a polymer to give a second mixture; and c) adding the second mixture to the first mixture to give the composition.

This disclosure further relates in part to a process for preparing a foamed or aerated composition. The process comprises: a) mixing rock dust and water to give a first mixture; b) mixing a pumping aid and a polymer to give a second mixture; c) adding the second mixture to the first mixture to give a composition; and d) mixing with agitation the composition to give the foamed or aerated composition.

This disclosure yet further relates in part to a process for forming a composition on a surface. The process comprises: a) mixing rock dust and water to give a first mixture; b) adding a pumping aid to the first mixture to give a second mixture; c) blending a polymer into the second mixture to give a third mixture; d) applying the third mixture to the surface; and e) allowing the third mixture to dry on the surface.

This disclosure also relates in part to a process for forming a composition on a surface. The process comprises: a) mixing rock dust and water to give a first mixture; b) mixing a pumping aid and a polymer to give a second mixture; c) adding the second mixture to the first mixture to give the composition; d) applying the composition to the surface; and e) allowing the composition to dry on the surface.

This disclosure further relates in part to a process for forming a composition on a surface. The process comprises: a) mixing rock dust and water to give a first mixture; b) mixing a pumping aid and a polymer to give a second mixture; c) adding the second mixture to the first mixture to give a third mixture; d) mixing with agitation the third mixture to give a foamed or aerated composition; e) applying the composition to the surface; and f) allowing the foamed or aerated composition to dry on the surface.

This disclosure yet further relates in part to a method of dusting coal mine surfaces. The method comprises: a) providing a composition comprising rock dust, water, a pumping aid, and a polymer; b) applying the composition to a coal mine surface; and c) allowing the composition to dry on the coal mine surface.

This disclosure also relates in part to a method of dusting coal mine surfaces. The method comprises: a) providing a composition comprising rock dust, water, a pumping aid, and a polymer; b) mixing with agitation the composition to give a foamed or aerated composition; c) applying the foamed or aerated composition to a coal mine surface; and d) allowing the foamed or aerated composition to dry on the coal mine surface.

This disclosure further relates in part to a method for suppressing propagation of a flame and/or fire caused by ignition of coal dust and/or gas within a coal mine. The method comprises: a) providing a composition comprising rock dust, water, a pumping aid, and a polymer; b) applying the composition to a coal mine surface; and c) allowing the composition to dry on the coal mine surface. The composition dried on the coal mine surface has sufficient adherence to the coal mine surface that, upon ignition of coal dust and/or gas within the coal mine, a concussion from an explosion and/or fire causes at least a portion of the rock dust to detach from the coal mine surface to produce a rock dust-air suspension that suppresses propagation of a flame and/or fire in the coal mine.

This disclosure yet further relates in part to a method for suppressing propagation of a flame and/or fire caused by ignition of coal dust and/or gas within a coal mine. The method comprises: a) providing a composition comprising rock dust, water, a pumping aid, and a polymer; b) mixing with agitation the composition to give a foamed or aerated composition; c) applying the foamed or aerated composition to a coal mine surface; and d) allowing the foamed or aerated composition to dry on the coal mine surface. The composition dried on the coal mine surface has sufficient adherence to the coal mine surface that, upon ignition of coal dust and/or gas within the coal mine, a concussion from an explosion and/or fire causes at least a portion of the rock dust to detach from the coal mine surface to produce a rock dust-air suspension that suppresses propagation of a flame and/or fire in the coal mine.

An advantage of this disclosure is that no excessive airborne dust is produced during application, thus eliminating the need to evacuate the personnel in the area during application. The process is much cleaner and far less wasteful than dry stone dusting. After application, the low water content of the composition permits evaporation of the water in the composition, resulting in a dry mass of agglomerated particles, e.g., agglomerated particles comprising polymer chains having rock dust particles attached thereto, that dusts readily and has similar properties to that of the dry dust used in traditional stone dusting practice. The composition dried on the coal mine surface has sufficient adherence to the coal mine surface that, upon ignition of coal dust and/or gas within a coal mine, a concussion from an explosion and/or fire causes at least a portion of the rock dust particles to detach from the polymer chains to produce a rock dust-air suspension. The rock dust-air suspension suppresses propagation of a flame and/or fire caused by ignition of coal dust and/or gas within the coal mine.

Further objects, features and advantages of the present disclosure will be understood by reference to the following drawings and detailed description.

DETAILED DESCRIPTION OF THE PREFERRED EMBODIMENT

Figure 1:
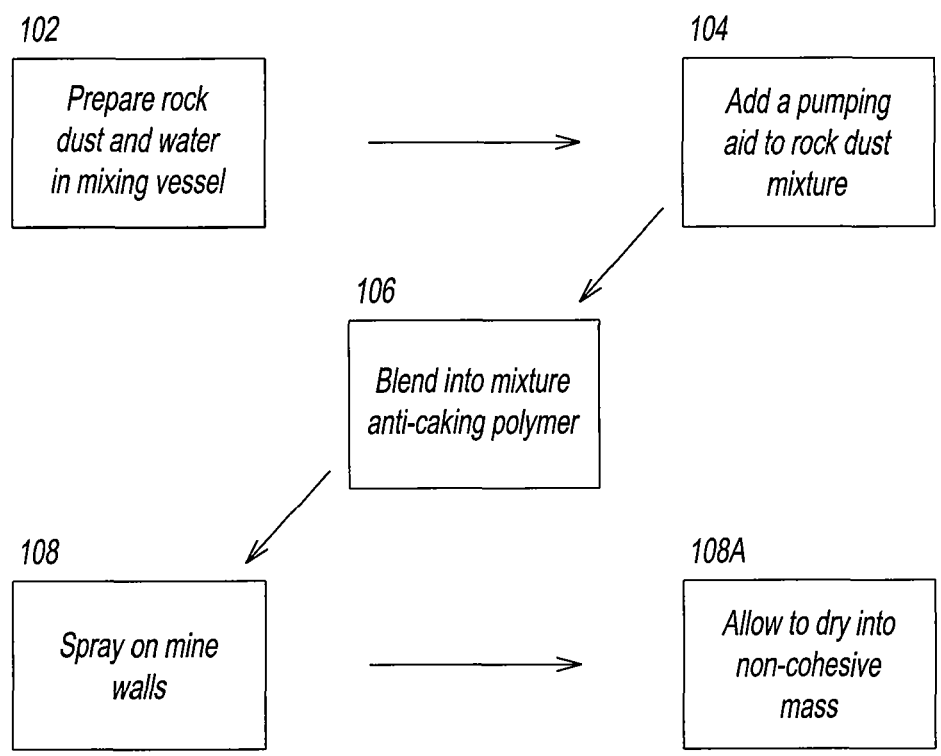
FIG. 1 is a schematic diagram of the process of this disclosure for preparing the rock dusting composition, spraying the composition onto mine walls, and allowing the composition to dry into a non-cohesive mass.

This disclosure provides a composition for prevention and suppression of fires in mines, as well as a method of dusting mine surfaces to prevent and suppress fires and explosions by applying the composition with a spray device that allows the composition to adhere to mine surfaces.

This disclosure includes a composition comprising rock dust, e.g., limestone dust, a polymer, e.g., acrylamide homopolymer or copolymer, a pumping aid, e.g., laurel ether sulfate, and water. This disclosure also includes a composition comprising rock dust, e.g., limestone dust, and a polymer, e.g., acrylamide homopolymer or copolymer. The compositions of this disclosure include both foamed and nonfoamed, aerated and nonaerated, compositions.

This disclosure utilizes the cohesive properties of water soluble polymers that allow a wet mixed rock dusting material to adhere to the mine walls in thicker layers than can be obtained with any current conventional methods. Because the rock dust is applied wet, particulates that go into suspension during placement are eliminated. The dusting composition will thicken and slightly gel when the anti-caking polymer is added to the dusting powder and water mixture. This will disperse the water molecules within the mass while in a wet state. As this material is allowed to dry on the mine walls, the polymer will dissipate. When the polymer dissipates, a void space is present within the rock dusting mass. This void space will vary between 3 and 50% by volume depending on the dosage and type of polymer that is used.

When subject to a mine explosion/concussion, this dusting composition will disperse as a fine powder rather than in small chunks, similar to the dispersion that will occur if the dusting composition was applied dry. The composition dried on the coal mine surface has sufficient adherence to the coal mine surface that, upon ignition of coal dust and/or gas within a coal mine, a concussion from an explosion and/or fire causes at least a portion of the rock dust particles to detach from the polymer chains to produce a rock dust-air suspension. The rock dust-air suspension suppresses propagation of a flame and/or fire caused by ignition of coal dust and/or gas within the coal mine.

The rock dusting material can consist of any fine inert powder, which is natural earthen or a byproduct such as fly ash or silica fume. Suitable rock dust for use in the compositions of this disclosure can be commercially available inert earthen materials approved by MSHA. Rock dust is defined by MSHA as pulverized limestone, dolomite, gypsum, anhydrite, shale, adobe, or other inert material, preferably light colored, 100 percent of which will pass through a sieve having 20 meshes per linear inch and 70 percent or more of which will pass through a sieve having 200 meshes per linear inch. See 30 C.F.R. 29.4.

Illustrative rock dust materials useful in the compositions of this disclosure include, for example, ground limestone, Class F fly ash, Class C fly ash, silica fume, gypsum, anhydrite, expansive clays, non-expansive clays, and fine ground mine tailings. Other illustrative rock dust materials include dolomite, magnesite, and marble. These materials or minerals are preferably water-insoluble, noncombustible, and may include organic or inorganic salts that are inert. The dust may also be composed of mixtures of the listed components. These dust materials are characterized by being easily incorporated into the composition. The composition can be applied with little water and upon drying reverts to a dry, air dispersible powder necessary for the suppression of fire and explosion.

The rock dust may include materials defined by MSHA such as pulverized limestone, dolomite, gypsum, anhydrite, shale, adobe, or other inert material. The rock dust is preferably light colored, 100 percent of which will pass through a sieve having 20 meshes per linear inch and 70 percent or more of which will pass through a sieve having 200 meshes per linear inch. Particle size of the rock dust should comply with applicable MSHA guidelines.

The concentration of rock dust in the compositions of this disclosure can vary over a wide range, and need only be that minimum amount necessary that, upon spraying, coats a mine surface. In general, depending on the composition of the rock dust, rock dust concentrations in the range of from about 25 weight percent or less to about 40 weight percent or greater, preferably about 27 weight percent to about 31 weight percent, and more preferably about 28 weight percent to about 30 weight percent, based on the weight of the applied composition, should be sufficient for most compositions.

The compositions of this disclosure exhibit a water content of from about 15 weight percent to about 40 weight percent, preferably from about 25 weight percent to about 29 weight percent, and more preferably from about 28 weight percent to about 32 weight percent, based on the weight of the applied composition. After application, the low water content of the material permits rapid evaporation of the water, resulting in a dry mass of agglomerated particles, e.g., agglomerated particles comprising polymer chains having rock dust particles attached thereto, that dusts readily. The compositions have a water content and a polymer content sufficient to allow the polymer (i) to disperse water molecules within the composition and, upon drying of the composition, (ii) to dissipate forming void spaces in the dried composition.

The moisture content of the dusting compositions depends on the type of dusting material to achieve optimum results using the polymer. The optimum results can be explained as the percentage of moisture required in the dusting composition to be within the range that will make the polymer effective. The moisture content range where the polymer is effective is usually non-pumpable and requires a separate commercially available pumping aid added to the rock dust and water prior to the addition of the polymer or air entrainment.

Illustrative pumping aids useful in the compositions of this disclosure include, for example, foaming agents and gases, e.g., air, incorporated into the compositions. The pumping aids are conventional materials known in the art. Suitable foaming agents include, for example, laurel ether sulfates, sulfates of fatty alcohol ethoxylates, sulfate esters of fatty alcohols, sulfates of fatty acids, sulfonates of fatty acids, ethoxylates of fatty acids, carboxylates of fatty acids, alkanolamides, alkanolamines, alkylaryl sulfonates, polyethylene oxide-polypropylene oxide block copolymers, alkylphenol ethoxylates, fluorocarbon containing surfactants, olefin sulfonates, olefin sulfates, hydrolyzed proteins, and mixtures thereof. The foaming agents can be dry powder or liquid. Preferred foaming agents include laurel ether sulfates. Suitable pumping aids useful in the compositions of this disclosure are available from Cellular Concrete LLC, Allentown, Pa.

The concentration of foaming agents in the compositions of this disclosure can vary over a wide range, and need only be that minimum amount necessary to make the composition pumpable. In general, depending on the composition of the foaming agent, foaming agent concentrations in the range of from about 33 percent volume to 48 percent volume, preferably about 40 percent volume to about 49 percent volume, and more preferably about 45 percent to about 49 percent, based on the volume of the applied composition, should be sufficient for most compositions. The dilution ratio of water to foaming agent may generally be about 3:1 to about 30:1, preferably about 10:1 to about 35:1. Dilution ratios are a function of the composition of the foaming agent and are dictated by the typical use, and end use characteristics, of the composition.

The pumping aids useful in the compositions of this disclosure can function as foaming agents and also as polymer dispersants. Preferably, the pumping aid, e.g., foaming agent, is present in the compositions of this disclosure in an amount sufficient, not only to make the composition pumpable, but also to disperse the polymer. Polymer dispersion will allow for optimum flocculation of the polymer.

The pumping aids useful in this disclosure may include air entrainment. Illustrative air entrainment for low water material transportation is described in U.S. Pat. No. 5,080,534, the disclosure of which is incorporated herein by reference.

Illustrative polymers useful in the compositions of this disclosure include, for example, anti-caking, water soluble polymers. The polymers are conventional materials known in the art. Suitable polymers include, for example, acrylamide homopolymers, acrylamide copolymers, a combination of acrylamide homopolymers and acrylamide copolymers, and polymers that are starch ethers. Preferred polymers include acrylamide homopolymers, acrylamide copolymers, and a combination of acrylamide homopolymers and acrylamide copolymers. The polymer can either be non-ionic or cationic. The polymer should have a minimum molecular weight of at least 25,000 daltons, preferably a minimum molecular weight of at least about 1,000,000 daltons. The polymers useful in the compositions of this disclosure have a molecular weight of from about 25,000 to about 5,000,000 daltons, preferably from about 1,000,000 to about 5,000,000 daltons, and the more preferably from about 1,000,000 to about 3,000,000 daltons.

The polymers can either be in a liquid or powder form. The advantages of using a liquid polymer relate to dispersion in wet rock dust. A liquid polymer will go into dispersion in the rock dust slurry more efficiently, thus requiring less mechanical mixing. The liquid polymer can also be added at the spray nozzle, relying on the restriction at the nozzle for dispersion in the slurry. An advantage of using a powder polymer would be lower shipping and handling weight, with the drawback being the increased mechanical mixing requirements. Suitable polymers useful in the compositions of this disclosure are available from Cellular Concrete LLC.

The concentration of polymer in the compositions of this disclosure can vary over a wide range, and need only be that minimum amount necessary to allow a wet mixed rock dusting material to adhere to the mine walls in thicker layers than can be obtained with any current conventional methods. In general, depending on the composition of the polymer, polymer concentrations in the range of from about 0.001 weight percent or less to about 0.1 weight percent or greater, preferably about 0.002 weight percent to about 0.005 weight percent, and more preferably about 0.002 weight percent to about 0.004 weight percent, based on the weight of the applied composition, should be sufficient for most compositions. The concentration of polymer added to the composition is dependent upon the polymer molecular weight. The higher the polymer molecular weight the lower the polymer concentration. If a higher concentration of moisture is required in the dusting mixture for pumping purposes, then a higher concentration of the polymer would be required. The compositions have a water content and a polymer content sufficient to allow the polymer (i) to disperse water molecules within the composition and, upon drying of the composition, (ii) to dissipate forming void spaces in the dried composition.

Figure 2:
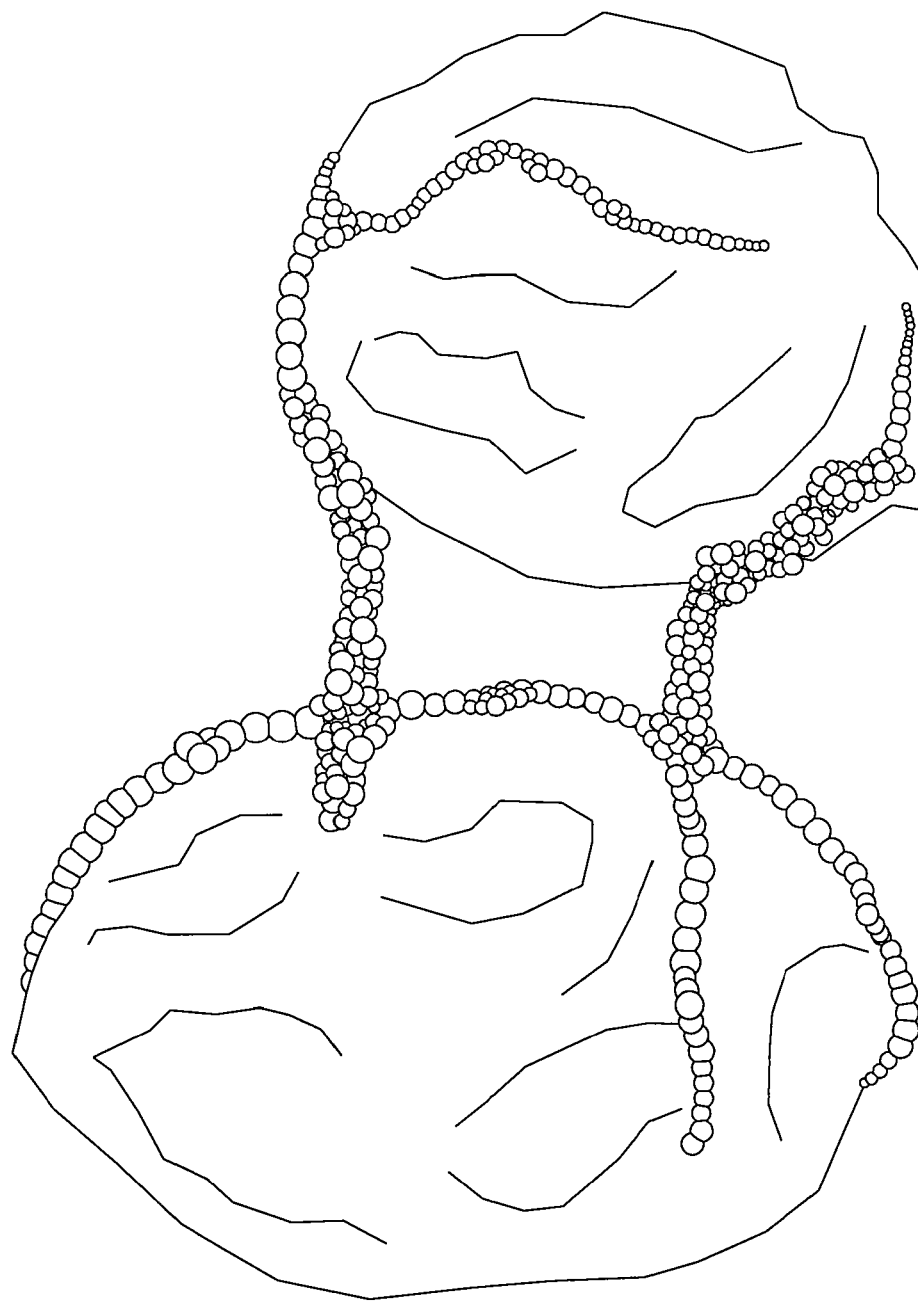
FIG. 2 depicts a polymer chain attached to rock dust particles holding the rock dust particles apart.
Figure 3:
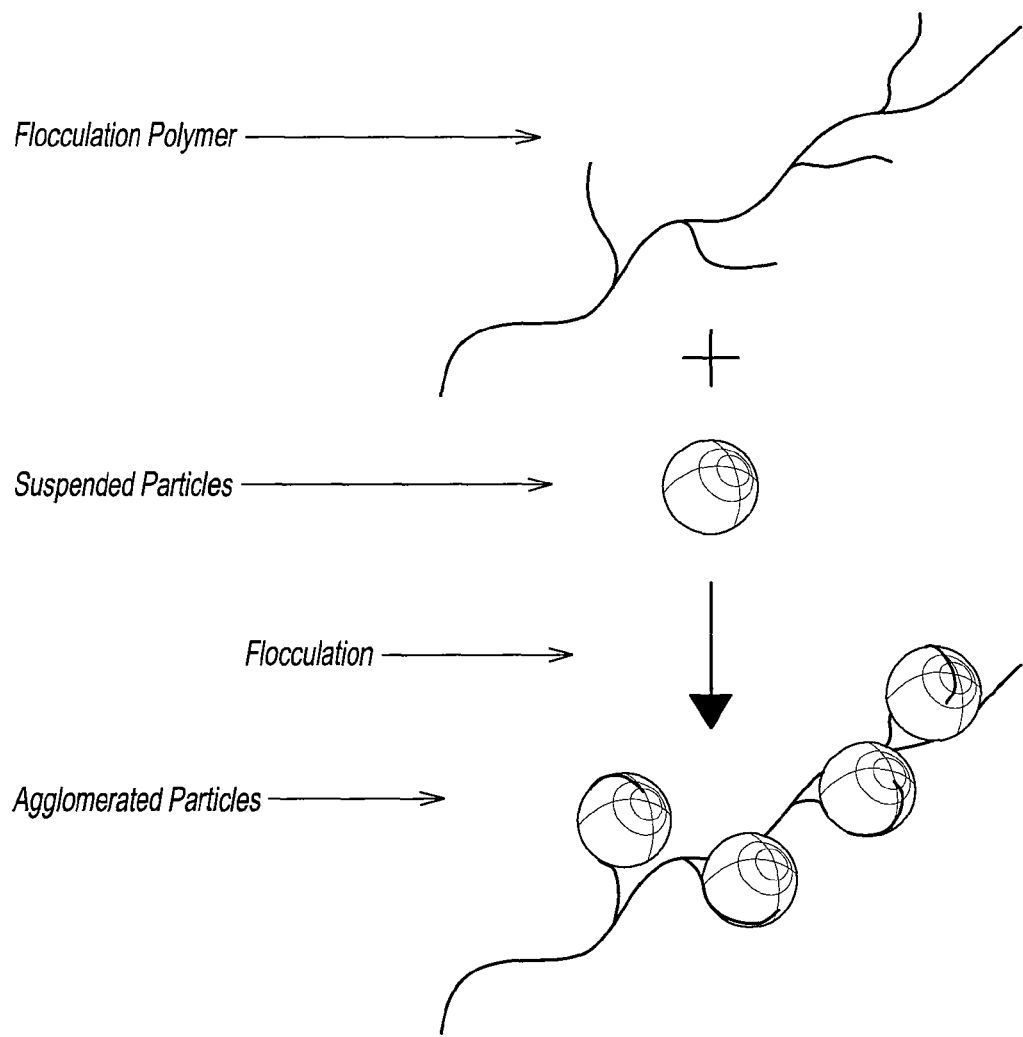
FIG. 3 depicts a flocculation process involving polymer and suspended rock dust particles to form agglomerated particles.

The polymer creates a chain that attaches to the rock dust particles and holds the particles apart as shown in FIGS. 2 and 3. This allows faster drying with void spaces being created by the faster drying and the space between the linked particles. The polymer will dry and dissipate, leaving weak bonds and voids between the rock dust particles. The voids will allow the rush of air, e.g., from a methane explosion, to penetrate into the dust mass and breaking the particles free from the wall along with breaking the particles free from each other. The void spaces comprise from about 3 to about 50 percent by volume of the composition.

Other ingredients that do not interfere with the fire prevention and suppression properties of the compositions of this disclosure may be added. For example, Borax can be used for set control when using a Class C fly ash.

A preferred composition of this disclosure includes a mixture of rock dust and polymer having a moisture content between about 26 and about 29 weight percent. The surfactant pumping aid is present in an amount that will decrease the slurry density between about 33 to 48 percent. This is approximately 0.1 to 0.3 weight percent concentrate by weight of slurry. An anti-cracking copolymer is present at a dosage of 1 percent by weight of slurry.

The process of this disclosure involves a) mixing rock dust and water to give a first mixture, b) adding a pumping aid to the first mixture to give a second mixture, and c) blending a polymer into the second mixture to give the composition of this disclosure. The pumping aid and polymer can also be injected in the grout stream after the pump. A tee with an injection port can be used to accomplish this. Compressed air can be used at pressures below about 125 psi to force the composition out of a nozzle to create higher flow rates and sufficient velocities required for a larger spray radius.

In another embodiment, the process of this disclosure involves a) mixing rock dust and water to give a first mixture; b) mixing a pumping aid and a polymer to give a second mixture; and c) adding the second mixture to the first mixture to give the composition of this disclosure. The process of this disclosure further involves d) mixing with agitation the composition to give a foamed or aerated composition. The mixing with agitation should create sufficient surface area to disperse the polymer.

In particular, the process of this disclosure involves a) providing a composition comprising rock dust, water, a pumping aid, and a polymer, and b) flocculating the composition under flocculation conditions sufficient to form agglomerated particles. The agglomerated particles comprise polymer chains having rock dust particles attached thereto. The agglomerated particles can be formed with or without the use of a pumping aid, however, they are preferably formed with the use of a foaming agent.

This disclosure also involves a process for forming a composition on a surface. Referring to FIG. 1, the process comprises a) mixing rock dust and water to give a first mixture 102, b) adding a pumping aid to the first mixture either in the mixing vessel or in the grout line to give a second mixture 104, c) blending a polymer into the second mixture either in the mixing vessel or in the grout line to give a third mixture 106, d) applying the third mixture to the surface 108, and e) allowing the third mixture to dry on the surface 108A.

In another embodiment, this disclosure involves a process for forming a composition on a surface by a) mixing rock dust and water to give a first mixture; b) mixing a pumping aid and a polymer to give a second mixture; c) adding the second mixture to the first mixture to give the composition; d) applying the composition to the surface; and e) allowing the composition to dry on the surface. The process of this disclosure further involves mixing with agitation the composition to give a foamed or aerated composition, and applying the foamed or aerated composition to the surface. The foamed or aerated composition is allowed to dry to form the composition on the surface. The mixing with agitation should create sufficient surface area to disperse the polymer.

Reaction conditions for the processes of this disclosure, e.g., flocculation, such as temperature, pressure and contact, e.g., mixing, time, may also vary greatly and any suitable combination of such conditions may be employed herein. The process temperature is preferably between about 5° C. to about 25° C., and more preferably between about 12° C. to about 15° C. Normally the process is carried out under ambient temperature and pressure and the contact time may vary from a matter of seconds or minutes to a few hours or greater. The ingredients can be added to the reaction mixture or combined in any order. The stir time employed can range from about 0.1 to about 400 hours, preferably from about 1 to 75 hours, and more preferably from about 4 to 16 hours, for all steps.

In an embodiment, the second mixture described in the processes above is preferably a synthetic surfactant polymer concentrate that includes a surfactant (pumping aid), copolymer, hexylene glycol and water. The synthetic surfactant polymer concentrate is available from Cellular Concrete LLC.

A method of this disclosure involves applying a rock dusting material to a mine surface, e.g., walls, ceilings, and floors. The dusting material can be a fine inert powder, natural earthen, or a byproduct such as fly ash or silica fume. This material is applied to the mine walls wet and in layers that are thicker than can be obtained when applied dry. Because the material is applied wet, virtually all air born particulates are eliminated during placement. The material can be sprayed on the mine surfaces using most commercially available rock dusting equipment. In a blast/concussion situation, the product will disperse from the mine walls, suppressing any explosion that can occur from methane ignition.

A method of dusting coal mine surfaces of this disclosure involves a) providing a composition comprising rock dust, water, a pumping aid, and a polymer; b) applying the composition to a coal mine surface; and c) allowing the composition to dry on the coal mine surface. The method of this disclosure further involves mixing with agitation the composition to give a foamed or aerated composition, applying the foamed or aerated composition to the coal mine surface, and allowing the foamed or aerated composition to dry on the coal mine surface. The mixing with agitation should create sufficient surface area to disperse the polymer. Preferably, the foamed or aerated composition dried on the coal mine surface has sufficient adherence to the coal mine surface that, upon ignition of coal dust and/or gas within the coal mine, a concussion from an explosion and/or fire causes at least a portion of the rock dust to detach from the coal mine surface to produce a rock dust-air suspension that suppresses propagation of a flame and/or fire in the coal mine.

In a preferred preparation method, a foamed slurry composition can be prepared by mixing with agitation limestone dust and water in a tank to give a slurry mixture. A paddle mixer is located at the bottom of the tank to provide the mixing with agitation. In a separate container, a pumping aid, e.g., surfactant, and a polymer are mixed to give a surfactant/polymer mixture. The surfactant/polymer mixture is added to the slurry mixture in the tank. The contents of the tank are mixed with agitation by the paddle mixer to give the foamed slurry composition. The mixing with agitation should create sufficient surface area to disperse the polymer. Additional limestone dust can optionally be added to the contents of the tank and mixed with agitation by the paddle mixer.

The foamed slurry composition includes a mixture of rock dust and polymer having a moisture content between about 26 and about 40 weight percent. The surfactant pumping aid is present in an amount that is approximately 0.1 to 0.6 weight percent concentrate by weight of foamed slurry composition. An anti-cracking copolymer is present at a dosage of 1 percent by weight of foamed slurry composition.

The foamed slurry composition is then pumped by a cavity pump from the tank to a nozzle for spraying. Prior to the end of the nozzle is a mixing tee which includes, in addition to a slurry supply line from the tank, an air supply line from a hydraulically powered compressor. The air supply line is used to supply air for spraying the foamed slurry composition onto a mine surface. Compressed air can be used at pressures below about 125 psi to force the foamed slurry composition out of a nozzle to create higher flow rates and sufficient velocities required for a larger spray radius.

The foamed slurry composition is then sprayed onto a mine surface. The spraying allows the foamed slurry composition to adhere to the surfaces of the mine, enabling application of multiple layers until a desired thickness is achieved. Each layer typically has a thickness of less than about 1/32 of an inch. The foamed slurry composition has a density of greater than about 60 pounds per cubic foot.

An embodiment of this disclosure includes a method for spraying a mine surface with a composition comprising rock dust, e.g., the dust of limestone, dolomite, magnesite, Class F fly ash, silica fume, gypsum, anhydrite, non-expansive clays, fine ground mine tailings, and mixtures thereof; water; a pumping aid, e.g., laurel ether sulfate; and a polymer, e.g., acrylamide homopolymer or copolymer. The method involves conveying the composition to a spray nozzle which can be accomplished by pumping or by pneumatic conveyance, and spraying the composition onto the mine surface. The composition adheres to the mine surface of the mine and dehydrates or loses moisture to form a porous coating, e.g., a coating having void spaces. When referring to a mine throughout this disclosure, it is also meant to include a stope.

A preferred method for dusting coal mine surfaces involves selecting the appropriate mixing vessel; adding the dry rock dust powder and water to the vessel; at the discharge of the mixing vessel, adding a tee to inject the pumping aid and anti-caking copolymer prior to the pump hose; and spraying the material on the mine walls.

A preferred method for applying the composition to coal mine surfaces comprises selecting a mixing vessel that has paddle mixers within the confinements. The size of the mixing vessel is preferably at least 13 cubic feet. The mixer should having sufficient mixing speed that can thoroughly mix the rock dust and water. At the discharge of the mixing vessel is a pump, either a progressive cavity or piston type that can pump at pressures of at least about 50 psi. The output of the pump should be a minimum of 3 gallons per minute. At the discharge of the pump, a tee is added to inject the pumping aid surfactant with anti caking polymer. The pumping aid and anti caking polymer are added to a steel pressurized tank. This tank is then pressurized with air to between about 100 to 200 psi. The pressurized surfactant pumping aid with anti caking polymer are then injected into the pump hose and the resulting composition sprayed onto the mine walls. The spray nozzle will consist of a restriction in the spray stream that will create velocity and pressure. This velocity and pressure will allow the product to be sprayed on the mine walls.

As indicated above, the most common method of applying rock dust is dry. This is because the rock dust will be non-cohesive when applied. In the event of a methane explosion, the rock dust will disperse as a powder. Lumping will not occur because there is no water used which causes the rock dust to be cohesive. In a wet spray application, the rock dust becomes a solid cohesive mass when allowed to dry. Thus in the event of a methane explosion, the rock dust will disperse in lumps and chunks. The rock dust will not have the fineness (surface area) to be effective in a mine explosion The present disclosure allows the rock dust to lift off as a powder when applied wet (about 300 microns or less), making the rock dust effective in a methane explosion. The material of this disclosure will disperse similar to the dry dust method.

The method of wet spraying rock dust is typically not used in the art for a variety of reasons. The method takes too long for the wet rock dust to dry on the mine walls. When the wet rock dust dries, it is too cohesive to lift off the mine walls in the event of a methane explosion. If the rock dust does lift off, it will be in chunks rather than in a fine powder.

The present disclosure allows the rock dust composition to be sprayed at a water content of about 25% less than conventional wet methods. This is primarily due to the use of a pumping aid. The pumping aid is typically a surfactant or air that moves the slurry dust through the hose. The rock dust composition will dry typically within 24 hours after being applied to a surface. The polymer will allow the material to be cohesive when applied in a wet state, but non-cohesive when allowed to dry. This will allow the material to disperse as a powder rather than in chunks if a methane explosion were to occur.

The compositions of this disclosure can be deposited on the coal mine surface at a desired thickness. For example, coatings formed on the coal mine surfaces can range in thickness from about 0.25 to about 2.5 cm, preferably from about 0.5 to about 2 cm, and more preferably from about 1.5 to about 1.8 cm. An advantage of applying the rock dust utilizing a wet composition is that when the wet composition is delivered such as by using a spray device, it allows the wet composition to adhere to the surfaces of the mine, enabling application of multiple layers until a desired thickness is achieved. Additionally, no excessive dust is produced during the application, thereby potentially eliminating the need to evacuate the mines during the process.

The composition of this disclosure combines wet dusting technology and polymers to allow for proper drying and lift characteristics for rock dusting. The rock dust typically dries within 24 hours depending on the mine air velocity and humidity.

The composition of this disclosure is fluid enough to be pumped and sprayed against mine wall surfaces, e.g., walls, ceilings and floors. The composition can be applied with a spraying device that allows the composition to adhere to the coal mine surfaces. Because the composition is applied wet, it can be built up to any thickness suitable for the particular application. The composition has a water content and a polymer content sufficient to allow the polymer (i) to disperse water molecules within the composition and, upon drying of the composition, (ii) to dissipate forming void spaces in the dried composition.

An applicator apparatus can be used in the method of this disclosure. The applicator apparatus can be a completely hydraulic powered unit that can be powered by a battery or diesel scoop power takeoff hydraulic circuit. The apparatus includes hose, e.g., 50 feet, and nozzle operation by the end user spray operator, who is supported by a scoop operator to function the unit. The applicator apparatus allows for batching of product and face spraying operations in permissible locations. A typical batch operation allows for 200 feet of rib and roof coverage of rock dust application depending on the height and width of the mine. A preferred applicator apparatus that can be used in the method of this disclosure is described in copending U.S. patent application Ser. No. (0007545USU), filed on an even date herewith, which is incorporated herein by reference.

The composition of this disclosure can be prepared at an underground station in the mine. To form the composition, the mixture of rock dust and water can be blended in a mobile tank. At the bottom of the tank can be a segmented auger screw that provides the mixing action needed to blend the ingredients. A paddle mixer can be used to blend the ingredients into a homogeneous composition. This mixing vessel can also be used to blend the pumping aid and polymer, or, alternatively, the pumping aid and polymer can be injected directly into the grout stream after the pump for mixing.

The mobile tank can be moved underground and positioned to any accessible area in the mine where the dusting activity may be required. Once at the position for application in the mine, a pump on or near the mobile tank can be used to pump the composition through a hose and nozzle where it is applied to the surfaces, e.g., walls, ceilings and floors, of the mine. Some of the composition may be lost on impact with the mine surfaces if blended in the mixing vessel. If the polymer is injected into the grout stream no loss will occur. The low water content of the compositions of this disclosure promotes rheological stiffening, making the mass sticky, and promoting adhesion to the surface and allowing build-up of the material to a desired thickness. The velocity of the composition sprayed from the nozzle should allow the retention of the composition on the surfaces and retain the properties needed for the performance of the composition in the event of an explosion and mine fire.

In addition, if the composition is to be applied in more than one place, the material can be fabricated at a first location and pumped to stations within the mine. There, the material could be retained for use as needed without having to transport the material in large tanks for long distances throughout the mine.

For example, the composition can be applied by a continuous cavity pump, to pump the composition to a pneumatic application nozzle. The use of this nozzle allows adequate application of composition onto the mine surface. The composition can additionally be applied using an airless system. The simplest form of an airless system can be the elimination of the nozzle and reliance only on the pressure produced by a continuous cavity pump to apply the material.

Various modifications and variations of this disclosure will be obvious to a worker skilled in the art and it is to be understood that such modifications and variations are to be included within the purview of this application and the spirit and scope of the claims.

EXAMPLES

Sprayed rock dust/polymer compositions were evaluated to determine the amount of void space. Table A below sets forth the rock dust/polymer composition, the amount of polymer in the composition, and the amount of void space resulting from that composition.

TABLE A

| .5% acrylamide polymer | Colorado limestone | 16% void space* |
| .75% acrylamide polymer | Colorado limestone | 35% void space |
| .5% acrylamide copolymer | Colorado limestone | 18% void space |
| .75% acrylamide copolymer | Colorado limestone | 42% void space |
| .5% acrylamide polymer | Bridger C ash | 12% void space |
| .75% acrylamide polymer | Bridger C ash | 31% void space* |
| .5% acrylamide copolymer | Bridger C ash | 13% void space |
| .75% acrylamide copolymer | Bridger C ash | 29% void space |

*Void space determined by unit weight.

Referring to FIG. 1, a mixture of water and dry rock dusting material is prepared in a mixing vessel in 102. Depending on the fineness and absorbency of the dusting powder, the moisture content will range between 19 wt % and 29 wt %.

In 104, a pumping aid is added to the mixture to facilitate pumping. The pumping aid can be any commercially available liquid or powder or an air entrainment as described in U.S. Pat. No. 5,080,534. The amount of pumping aid is determined in accordance with the manufacture guidelines.

In 106, an anti caking polymer is blended into the mixture using a predetermined dosage. The predetermined dosage can be evaluated prior to the particular rock dusting application.

Tests were performed to determine how much polymer is required to obtain optimum cohesion and lift off of the particular rock dusting compound. The results are set forth in Table B below. This test consists of displacement of the polymerized material when a 7.62×15.24 cm plastic cylinder is inverted.

TABLE B

| 10 oz per 100 wt polymer | Colorado limestone | 7.64 cm. slump | 25-40 psi pump *pressure |
| 15 oz per 100 wt polymer | Colorado limestone | 6.25 cm. slump | 30-55 psi pump *pressure |
| 20 oz per 100 wt polymer | Colorado limestone | 2.4 cm slump | 45-75 psi pump *pressure |
| 25 oz per 100 wt polymer | Colorado limestone | .5 cm slump | 100+ psi pump *pressure |

*Pump through 2 inch hose 100 ft at 3.7 gallons per minute.

Based on slump tests performed in the laboratory, pump tests are then performed to determine workable pumping pressures. Pressures less than 100 psi are within field performance guidelines. It has also been determined that cohesion has a direct correlation to slump. Slumps that are less than 6 cm will form thicker layers without sloughing.

Lifting tests were performed on the polymerized dusting compound. These tests were performed in the laboratory to compare polymer dosage to the amount of dusting compound that can be brushed off in a dry state. This test was performed by applying dusting compound, water, a pumping aid, and an anticaking polymer onto an 8×8 inch rigid substrate at a thickness of 1.9 cm. This sample was oven dried for a period of 3 hours. After drying was complete, the sample specimen of each of the varying polymer amounts were set at a vertical angle and then brushed using a 5.08 cm brush. The amount of material that sloughs on the pan determines field performance.

TABLE C

| .25% copolymer | Bridger C ash | 08% void | 69 grams * |
| .5% copolymer | Bridger C ash | 19% void | 78 grams |
| .75% copolymer | Bridger C ash | 39% void | 54 grams |
| 1.0% copolymer | Bridger C ash | 46% void | 51 grams |
| .25% copolymer | Colorado limestone | 12% void | 101 grams |
| .5% copolymer | Colorado limestone | 22% void | 112 grams |
| .75% copolymer | Colorado limestone | 36% void | 110 grams |
| 1.0% copolymer | Colorado limestone | 41% void | 78 grams |

* Weight of material collected in pan when brushed.

From Table C, the sample specimens reached optimum performance at a dosage of between 0.5 and 0.75% copolymer. The amount of lift off then diminished. It should be noted that there was not a correlation between the void space and the lift off. These findings suggest that the particle alignment during coalescence affects ultimate lift off characteristics. It would be expected that various blends of polymers would achieve different results than Table C. One factor that may determine the type of polymer to be used would depend on the polymer cost impact on the economics of the formulation. It has been observed that the higher molecular weight polymers will show increase pumping pressures which could be a safety issue, thus a lower molecular weight polymer would be used.

In 108, after the polymerized rock dusting is sprayed on the mine walls, lab tests have shown that the product will dry on the mine walls in a time frame from about 2 to about 8 hours.

In 108A, many factors will affect drying of the composition into a non-cohesive mass including mine temperature, airflow, relative humidity and specific type of dusting product used. The relatively quick drying time is due to the fact that the product is pumped at low moisture content with the addition of a pumping aid.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. A composition consisting essentially of rock dust, water, a pumping aid, and a polymer; wherein the composition has a water content and a polymer content sufficient to allow the polymer (i) to disperse water molecules within the composition and, upon drying of the composition, (ii) to dissipate forming void spaces in the dried composition; wherein the dried composition comprises agglomerated particles, said agglomerated particles comprising polymer chains having rock dust particles attached thereto; wherein the water content is from about 15 to about 40 percent by weight of the composition, and the polymer content is from about 0.001 to about 0.1 percent by weight of the composition; and wherein the pumping aid consists essentially of a surfactant or a gas incorporated into the composition; wherein the surfactant is present in an amount sufficient to make the composition pumpable and to disperse the polymer.

2. The composition of claim 1 wherein the void spaces comprise from about 3 to about 50 percent by volume of the composition.

3. The composition of claim 1 wherein the polymer is selected from the group consisting of acrylamide homopolymers, acrylamide copolymers, a combination of acrylamide homopolymers and acrylamide copolymers, and polymers that are starch ethers.

4. The composition of claim 1 wherein the rock dust is selected from the group consisting of ground limestone, Class F fly ash, Class C fly ash, silica fume, gypsum, anhydrite, expansive clays, non-expansive clays, fine ground mine tailings, and mixtures thereof.

5. The composition of claim 1 wherein the surfactant is selected from the group consisting of laurel ether sulfates, sulfates of fatty alcohol ethoxylates, sulfate esters of fatty alcohols, sulfates of fatty acids, sulfonates of fatty acids, ethoxylates of fatty acids, carboxylates of fatty acids, alkanolamides, alkanolamines, alkylaryl sulfonates, polyethylene oxide-polypropylene oxide block copolymers, alkylphenol ethoxylates, fluorocarbon containing surfactants, olefin sulfonates, olefin sulfates, hydrolyzed proteins, and mixtures thereof.

6. A foamed or aerated composition consisting essentially of rock dust, water, a pumping aid, and a polymer; wherein the water content is from about 15 to about 40 percent by weight of the composition, and the polymer content is from about 0.001 to about 0.1 percent by weight of the composition; and wherein the pumping aid consists essentially of a surfactant or a gas incorporated into the composition; wherein the surfactant is present in an amount sufficient to make the composition pumpable and to disperse the polymer.

7. A process for preparing a composition, said process comprising:
   a) providing the composition according to claim 1; and
   b) flocculating the composition under flocculation conditions sufficient to form agglomerated particles, said agglomerated particles comprising polymer chains having rock dust particles attached thereto.

8. A process for preparing the composition according to claim 1, said process comprising:
   a) mixing the rock dust and the water to give a first mixture;
   b) mixing the pumping aid and the polymer to give a second mixture;
   c) adding the second mixture to the first mixture to give said composition; and
   d) optionally mixing with agitation the composition to give a foamed or aerated composition.

9. A process for forming the composition according to claim 1 on a surface, said process comprising:
   a) mixing the rock dust and the water to give a first mixture;
   b) mixing the pumping aid and the polymer to give a second mixture;
   c) adding the second mixture to the first mixture to give said composition;
   d) optionally mixing with agitation the composition to give a foamed or aerated composition;
   d) applying the composition or foamed or aerated composition to the surface; and
   e) allowing the composition or foamed or aerated composition to dry on the surface.

10. The process of claim 9 wherein the composition or foamed or aerated composition allowed to dry on the surface comprises agglomerated particles, said agglomerated particles comprising polymer chains having rock dust particles attached thereto.

11. A method of dusting coal mine surfaces, said method comprising:
   a) providing the composition according to claim 1;
   b) optionally mixing with agitation the composition to give a foamed or aerated composition;
   c) applying the composition or foamed or aerated composition to a coal mine surface; and
   d) allowing the composition or foamed or aerated composition to dry on the coal mine surface.

12. The method of claim 11 wherein the composition dried on the coal mine surface comprises agglomerated particles, said agglomerated particles comprising polymer chains having rock dust particles attached thereto.

13. The method of claim 11 wherein the composition or foamed or aerated composition dried on the coal mine surface has sufficient adherence to the coal mine surface that, upon ignition of coal dust and/or gas within a coal mine, a concussion from an explosion and/or fire causes at least a portion of the rock dust particles to detach from the polymer chains to produce a rock dust-air suspension.

14. The method of claim 13 wherein the rock dust-air suspension suppresses propagation of a flame and/or fire caused by ignition of coal dust and/or gas within the coal mine.

15. A method for suppressing propagation of a flame and/or fire caused by ignition of coal dust and/or gas within a coal mine, said method comprising:
   a) providing the composition according to claim 1;
   d) optionally mixing with agitation the composition to give a foamed or aerated composition;
   b) applying the composition or foamed or aerated composition to a coal mine surface; and
   c) allowing the composition or foamed or aerated composition to dry on the coal mine surface;
wherein said composition or foamed or aerated composition dried on the coal mine surface has sufficient adherence to the coal mine surface that, upon ignition of coal dust and/or gas within the coal mine, a concussion from an explosion and/or fire causes at least a portion of the rock dust to detach from the coal mine surface to produce a rock dust-air suspension that suppresses propagation of a flame and/or fire in the coal mine.

16. The method of claim 15 wherein the composition dried on the coal mine surface comprises agglomerated particles, said agglomerated particles comprising polymer chains having rock dust particles attached thereto.

* * * * *